United States Patent
Kairali et al.

(10) Patent No.: US 12,475,116 B1
(45) Date of Patent: Nov. 18, 2025

(54) DELAYED SPLIT EXECUTION OF A QUERY

(71) Applicant: International Business Machines Corporation, Armonk, NY (US)

(72) Inventors: Sudheesh S. Kairali, Kozhikode (IN); Binoy Thomas, Kozhikode (IN); Sarbajit Kumar Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/760,058

(22) Filed: Jul. 1, 2024

(51) Int. Cl.
*G06F 16/2453* (2019.01)

(52) U.S. Cl.
CPC .. *G06F 16/24535* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 7,337,163 B1 | 2/2008 | Srinivasan et al. | |
| 8,209,674 B2 | 6/2012 | Meijer et al. | |
| 11,789,950 B1 | 10/2023 | Bernier et al. | |
| 2004/0103088 A1* | 5/2004 | Cragun | G06F 16/2471 |
| 2007/0192300 A1* | 8/2007 | Reuther | G06F 16/2452 |
| 2011/0040749 A1* | 2/2011 | Ceri | G06F 16/9535 |
| | | | 707/723 |
| 2014/0068094 A1* | 3/2014 | Burch | G06F 16/35 |
| 2014/0095473 A1* | 4/2014 | Srinivasan | G06F 16/2453 |
| | | | 707/718 |
| 2016/0283551 A1* | 9/2016 | Fokoue-Nkoutche | |
| | | | G06F 16/182 |
| 2016/0292430 A1 | 10/2016 | Antonopoulos et al. | |
| 2018/0039674 A1* | 2/2018 | Seyvet | G06F 16/24535 |
| 2019/0258631 A1 | 8/2019 | Pal et al. | |
| 2020/0327132 A1* | 10/2020 | Sheasby | G06F 16/9535 |
| 2023/0153816 A1* | 5/2023 | Onovae | G06F 16/95 |

FOREIGN PATENT DOCUMENTS

CN 117785928 A 3/2024

OTHER PUBLICATIONS

"Data lake solutions", https://www.ibm.com/data-lake, (Retrieved: May 16, 2024), 9 pages.
"What is a data lake?", https://www.ibm.com/topics/data-lake, (Retrieved: May 16, 2024), 10 pages.
Greenberg, "Querying Multiple Data Sources with a Single Query using Presto's Query Federation" https://bigdataboutique.com/blog/querying-multiple-data-sources-with-a-single-query-using-prestos-query-federation-veulwi, Retrieved: May 16, 2024, 9 pages.

* cited by examiner

*Primary Examiner* — Son T Hoang
(74) *Attorney, Agent, or Firm* — CANTOR COLBURN LLP; Teddi Maranzano

(57) ABSTRACT

Aspects include processing the query from a client device to divide the query into a plurality of subqueries, identifying a data source that corresponds to each of the plurality of subqueries, and identifying an expected response time for each of the data sources. Based on a determination that at least one of the expected response times is greater than a default timeout threshold, aspects include classifying the query as a delayed split query and updating a timeout value of the query to be a delayed timeout threshold, which is greater than the default timeout threshold. Aspects also include performing the delayed split execution of the query.

15 Claims, 5 Drawing Sheets

DELAYED SPLIT EXECUTION OF A QUERY

BACKGROUND

The present disclosure generally relates to query processing, and more specifically, to performing a delayed split execution of a query.

Data lakes are large data storage systems that often include multiple different data storage devices. These different data storage devices are often used to store various types of data and each of the data storage devices may utilize different data storage schemes. Often, when a query is executed for data stored in the data lake, the query is divided into subqueries that correspond to different storage devices. Since the subqueries are directed to different storage devices, the response times for the subqueries are often not the same. In many cases, a query may fail, or timeout, based on a delayed response time of one of the storage devices that corresponds to one of the subqueries.

SUMMARY

Embodiments of the present disclosure are directed to computer-implemented methods for performing a delayed split execution of a query. According to an aspect, a computer-implemented method includes processing the query from a client device to divide the query into a plurality of subqueries, identifying a data source that corresponds to each of the plurality of subqueries, and identifying an expected response time for each of the data sources. Based on a determination that at least one of the expected response times is greater than a default timeout threshold, aspects include classifying the query as a delayed split query and updating a timeout value of the query to be a delayed timeout threshold, which is greater than the default timeout threshold. Aspects also include performing the delayed split execution of the query.

Embodiments also include computing systems and computer program products for performing a delayed split execution of a query.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
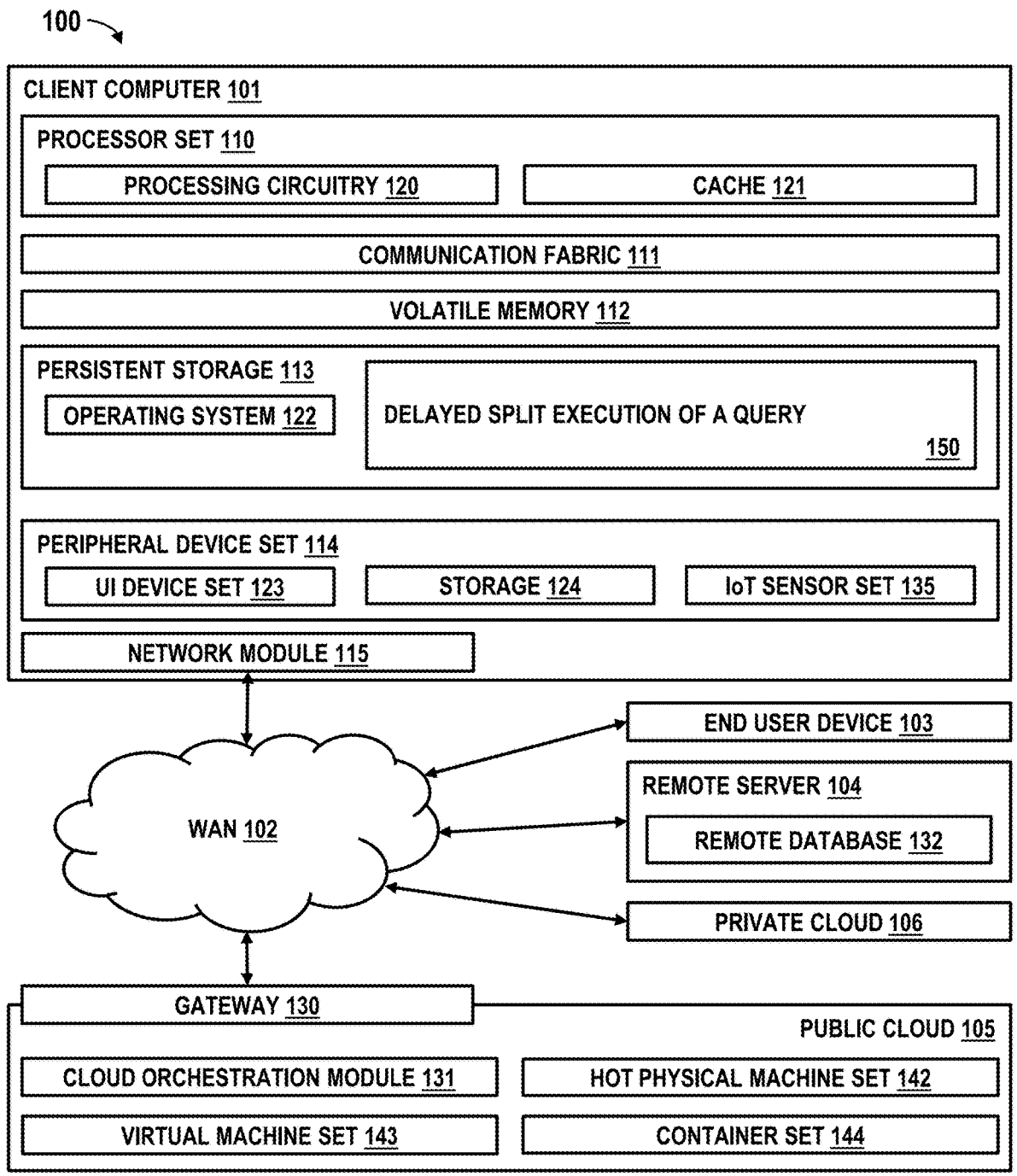
FIG. 1 depicts a block diagram of an example computer system for use in conjunction with one or more embodiments of the present disclosure.

As described above, when a query is executed to obtain data stored in the data lake, the query is divided into subqueries that often correspond to different storage devices. Since the subqueries are directed to different storage devices, the response times for the subqueries are often not the same. In many cases, a query may fail, or timeout, based on a delayed response time of one of the storage devices that corresponds to one of the subqueries.

In exemplary embodiments, systems, methods, and computer program products for performing a delayed split execution of a query are provided. In exemplary embodiments, once a query is subdivided into a plurality of subqueries that correspond to different storage devices, an expected response time for each of the different storage devices is obtained. Based on a determination that at least one of the expected response times is greater than a default timeout threshold, the query is classified as a delayed split query, and the timeout value of the query is updated to a delayed timeout threshold, which is greater than the default timeout threshold.

In exemplary embodiments, delayed split execution of the query is performed in one of two methods that include issuing at least two of the plurality of subqueries to the corresponding data sources at different times, which are calculated based on the expected response time for each of the data sources and issuing all of the plurality of subqueries to the corresponding data sources at a same time. In exemplary embodiments, a determination of which method is used to perform the delayed split execution is based on the expected size of the result of the query.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as performing delayed split execution of a query as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2:
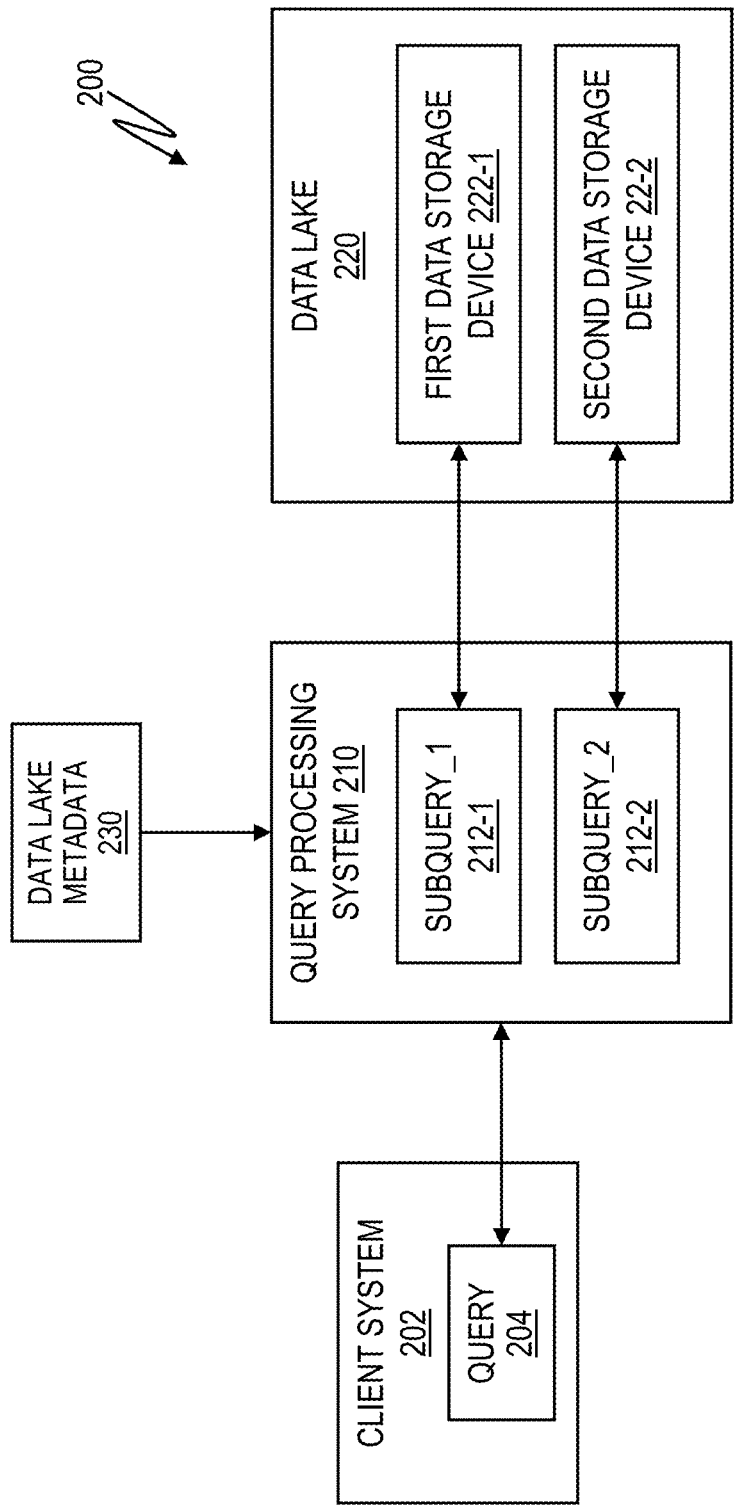
FIG. 2 depicts a block diagram of a system for performing a split execution of a query in accordance with one or more embodiments of the present disclosure.

Referring now to FIG. 2, a block diagram of a system 200 for a system for performing a split execution of a query in accordance with one or more embodiments of the present disclosure is shown. In exemplary embodiments, the system 200 includes a client system 202, a query processing system, and a data lake 220. In exemplary embodiments, the query processing system 210 and the data lake 220 may be embodied in one of a public cloud 105 or a private cloud 106 such as those shown in FIG. 1. In exemplary embodiments, the query processing system 210 is configured to receive a query 204 from the client system 202 and to divide the query 204 into a plurality of subqueries 212, where each subquery corresponds to different data storage device of the data lake 220. For example, query 204 may be divided into subquery_1 212-1 which corresponds to a first data storage device 222-1, and subquery_2 212-2 which corresponds to a second data storage device 222-2.

In exemplary embodiments, the query processing system 210 divides query 204 into the plurality of subqueries 212 based on data lake metadata 230, which includes information about the organizational structure of the data lake 220. For example, the data lake metadata 230 may include a list of the different types and locations of the storage devices that make up the data lake 220. In addition, the data lake metadata 230 may be configured to keep track of where different types of data are stored in the data lake 220.

Figure 3:
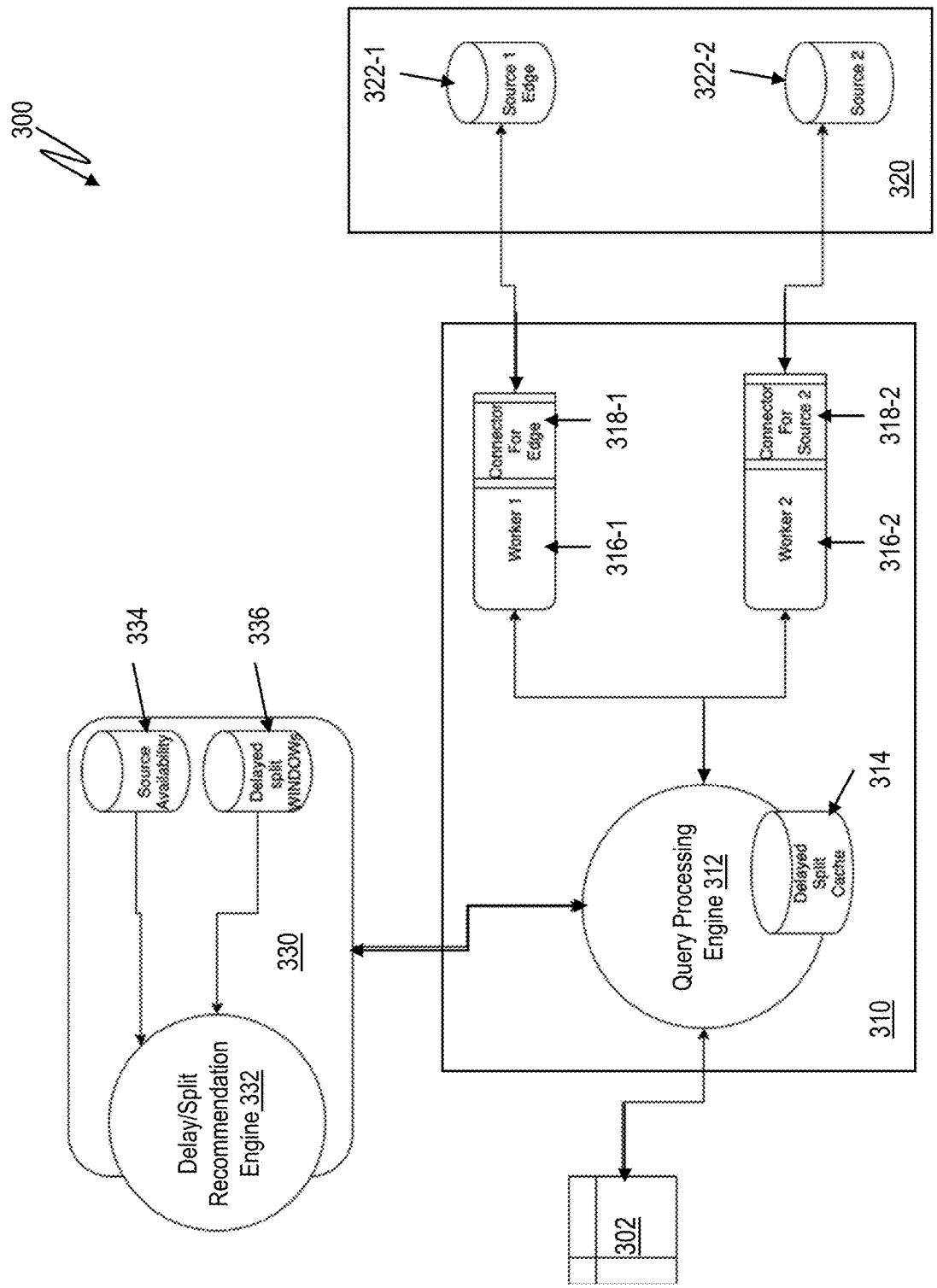
FIG. 3 depicts a block diagram of a system for performing a delayed split execution of a query in accordance with one or more embodiments of the present disclosure.

Referring now to FIG. 3, a block diagram of a system 300 for performing a delayed split execution of a query in accordance with one or more embodiments of the present disclosure is shown. The system 300 includes a query processing system 310 that is configured to execute a query 302 to obtain data that is stored across multiple data sources 322 in a data lake 320. The query 302 is received by the query processing system 310 and processed by a query processing engine 312. The query processing engine 312 is configured to divide the query 302 into a plurality of subqueries that are each issued to a worker 316, such as one of worker 316-1 and worker 316-2, which correspond to different data sources 322. Each worker 316 is configured to communicate with a data source 322, such as one of data source 322-1 and data source 322-2 via a connection 318, such as one of connection 318-1 and connection 318-2. Once each data source 322 executes the subquery, the data source 322 returns its results to the query processing system 310 via connection 318. The query processing system 310 then combines the results from the multiple data sources 322 and returns the combined result to a client device. In exemplary embodiments, the query processing system 310 includes a cache 314 that can be used to temporarily store results received from one or more data sources 322.

In exemplary embodiments, the system 300 also includes a data lake metadata system 330 that is configured to obtain and track metadata regarding the data sources 322 of the data lake 320. For example, the data lake metadata system 330 may track what types of data are stored on each of the different data sources 322 of the data lake 320. In one embodiment, the data source 322 may provide availability data 334 to the data lake metadata system 330. The availability data 334 may include information about scheduled downtime, typical response times, and the like corresponding to the data source 322. In some embodiments, the data lake metadata system 330 is configured to monitor subqueries transmitted by the query processing engine 312 to the various data sources 322 and to record the response times from the data sources 322 to generate the availability data 334.

In exemplary embodiments, the data lake metadata system 330 includes a delay/split recommendation engine 332 that is configured to communicate with the query processing engine 312. In exemplary embodiments, the query processing engine 312 is configured to identify the data sources 322 that correspond to subqueries of a query 302 and to provide an identification of the data sources 322 to the delay/split recommendation engine 332. In response, the delay/split recommendation engine 332 provides a recommendation on whether to execute the query 302 normally or as a delay split execution query. In exemplary embodiments, the determination to execute query 302 as a delay split execution query is based at least in part on the expected response times of the data sources 322 that correspond to query 302. More specifically, query 302 is classified as a delay split execution query based on a determination that one of the expected response times of the data sources 322 that corresponds to the query 302 exceeds a default timeout threshold. In exemplary embodiments, the default timeout threshold is a parameter of the query processing system 310 that is used to determine when a query 302 fails or times out.

In exemplary embodiments, based on determining that the query 302 is a delayed split execution query, the delay/split recommendation engine 332 may determine a delayed split window 336 for executing the query 302. In exemplary embodiments, the delayed split window 336 is a relative timing scheme for when the query processing engine 312 should issue each of the subqueries to the data sources 322, such that the results from the data sources 322 are received by the query processing engine 312 within a threshold time range. In one embodiment, the delay/split recommendation engine 332 may recommend issuing all of the subqueries of a delayed split execution query simultaneously and storing the results received at different times in the cache 314 until all of the results have been received. In another embodiment, the delay/split recommendation engine 332 may recommend issuing at least two of the subqueries of a delayed split execution query at different times, such that the expected results of the at least two of the subqueries are expected to be received within a threshold time range of one another.

Figure 4:
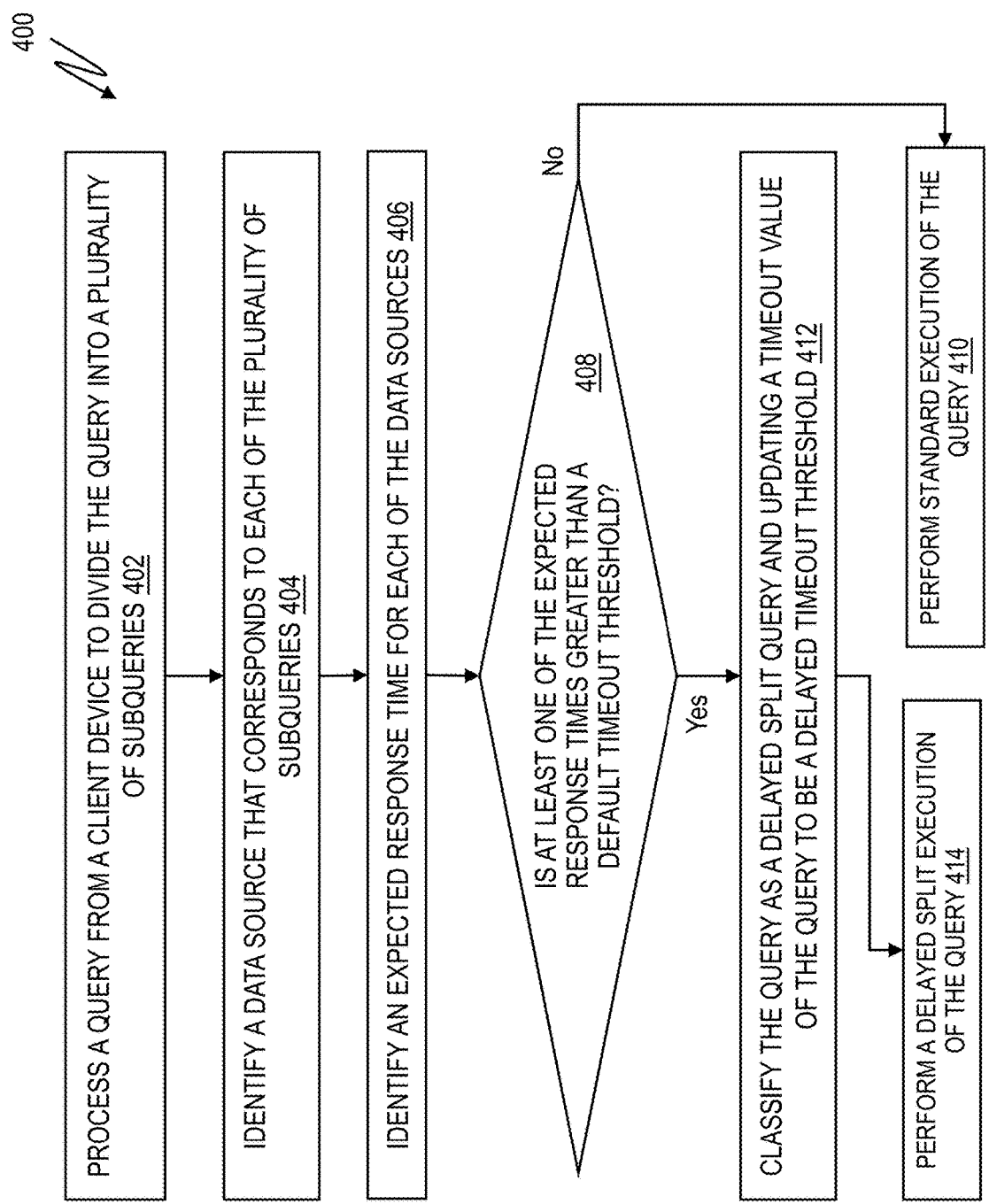
FIG. 4 depicts a flowchart of a method for identifying a query to be performed as a delayed split query in accordance with one or more embodiments of the present disclosure.

Referring now to FIG. 4, a flowchart of a method 400 for identifying a query to be performed as a delayed split query in accordance with one or more embodiments of the present disclosure is shown. In one embodiment, the method 400 is performed by a query processing engine 312 of a query processing system 310, such as the ones shown in FIG. 3. As shown at block 402, the method 400 includes processing a query from a client device to divide the query into a plurality of subqueries. Next, as shown at block 404, the method 400 includes identifying a data source that corresponds to each of the plurality of subqueries. The method 400 also includes identifying an expected response time for each of the data sources, as shown at block 406.

At decision block 408, the method 400 includes determining whether at least one of the expected response times greater than a default timeout threshold. Based on a determination that none of the expected response times are greater than a default timeout threshold, the method 400 proceeds to block 410 and includes performing a standard execution of the query. Based on a determination that at least one of the expected response times is greater than a default timeout threshold, the method 400 proceeds to block 412 and includes classifying the query as a delayed split query and updating a timeout value of the query to be a delayed timeout threshold. In exemplary embodiments, the delayed timeout threshold is greater than the default timeout threshold value. Next, as shown at block 414, the method 400 includes performing a delayed split execution of the query. In exemplary embodiments, both the delayed timeout threshold and the default timeout threshold values are parameters that may be set by an administrator of the query processing system.

Figure 5:
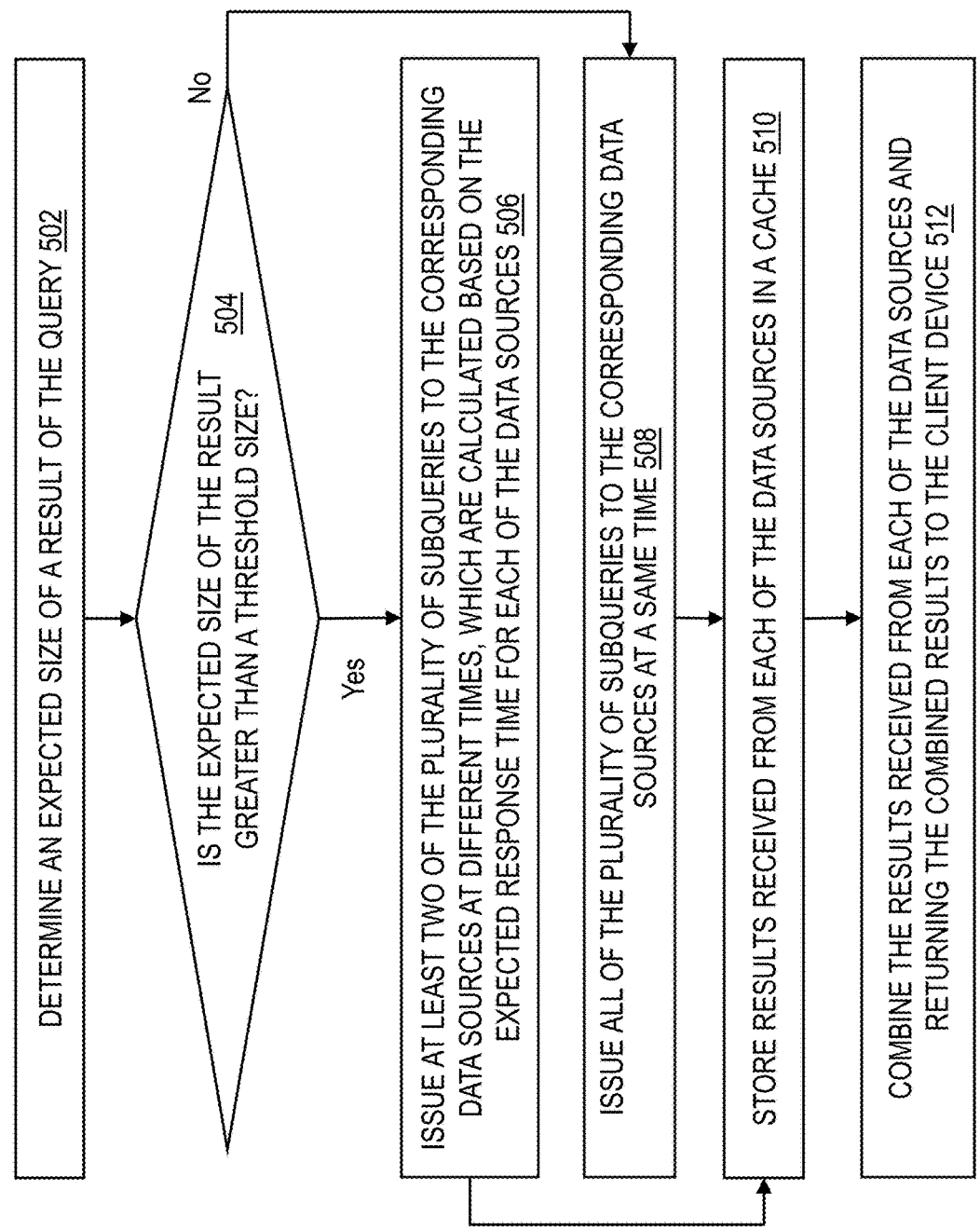
FIG. 5 depicts a flowchart of a method for performing a delayed split execution of a query in accordance with one or more embodiments of the present disclosure.

Referring now to FIG. 5, a flowchart of a method 500 for performing a delayed split execution of a query in accordance with one or more embodiments of the present disclosure is shown. In one embodiment, the method 400 is performed by a query processing engine 312 of a query processing system, such as the ones shown in FIG. 3. As shown at block 502, the method 500 includes determining an expected size of a result of the query. Next, as shown at decision block 504, the method 500 includes determining whether the expected size of the result is greater than a threshold size. In exemplary embodiments, the threshold size is a function of an available space in a cache of the query processing system. For example, the threshold size may be a dynamic value that is set to a percentage, such as fifty percent, of the available space in a cache of the query processing system.

Based on a determination that the expected size of the result is greater than a threshold size, the method 500 proceeds to block 506 and includes issuing at least two of the plurality of subqueries to the corresponding data sources at different times, which are calculated based on the expected response time for each of the data sources. In exemplary embodiments, each of the plurality of subqueries are issued to corresponding data sources such that an expected query response time for all of the plurality of subqueries is within a threshold time range. In this embodiment, the difference between the timing of the expected return of the results is minimized to reduce the amount of usage of the cache to store the intermediate results.

Based on a determination that the expected size of the result is not greater than a threshold size, the method 500 proceeds to block 508 and includes issuing all of the plurality of subqueries to the corresponding data sources at the same time. In this embodiment, the expected usage of the cache is less than the set threshold amount, and all of the subqueries are issued simultaneously. As shown at block 510, the method 500 also includes storing the results received from each of the data sources in a cache of the query processing system. Next, as shown at block 512, the method 500 includes combining the results received from each of the data sources and returning the combined results to the client device.

In exemplary embodiments, the query processing system may identify that a query that is to be classified as a delayed split execution query can be processed as a standard query by delaying the execution of the query for a specified time based on the availability of one or more of the data sources. For example, if a data source is currently unavailable and the expected response time of the data source is greater than a default timeout threshold but the data source is expected to be available and have an expected response time that is less than the default timeout threshold, the entire query execution can be delayed until the data source is available to avoid a delayed split execution query. In these embodiments, the query processing system may be configured to provide a recommendation to the source of the query, e.g., the client device, to adjust a timing of future scheduled queries to avoid a potential delayed split execution query. For example, the query processing system may identify time windows for a query as delayed split execution windows, i.e., time periods where the query will be executed as a delayed split execution window, and inform the client devices of the delayed split execution windows. In exemplary embodiments, by informing the client devices of the delayed split execution windows, the number of queries that the query processing system must process as delayed split execution queries can be reduced.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for delayed split execution of a query, the method comprising:
   processing the query from a client device to divide the query into a plurality of subqueries;
   identifying a data source that corresponds to each of the plurality of subqueries;
   identifying an expected response time for each of the data sources;
   based on a determination that at least one of the expected response times is greater than a default timeout threshold, classifying the query as a delayed split query and updating a timeout value of the query to be a delayed timeout threshold, which is greater than the default timeout threshold; and
   performing a delayed split execution of the query, wherein performing the delayed split execution of the query includes determining an expected size of a result of the query,
   wherein based on a determination that the expected size of the result of the query is not greater than a threshold size, performing a delayed split execution of the query comprises:
   issuing all of the plurality of subqueries to the corresponding data sources at a same time;
   storing results received from each of the data sources in a cache;
   based on a determination that the results from all of the data sources have been received, combining the results received from each of the data sources and returning the combined results to the client device.

2. The computer-implemented method of claim 1, wherein performing the delayed split execution of the query includes issuing at least two of the plurality of subqueries to the corresponding data sources at different times, which are calculated based on the expected response time for each of the data sources.

3. The computer-implemented method of claim 2, wherein each of the plurality of subqueries is issued to corresponding data sources such that an expected query response time for all of the plurality of subqueries are within a threshold time range.

4. The computer-implemented method of claim 1, wherein performing a delayed split execution of the query comprises:
   issuing all of the plurality of subqueries to the corresponding data sources at a same time;
   storing results received from each of the data sources in a cache;
   based on a determination that the results from all of the data sources have been received, combining the results received from each of the data sources and returning the combined results to the client device.

5. The computer-implemented method of claim 1, wherein based on a determination that the expected size of the result of the query is greater than a threshold size, performing the delayed split execution of the query includes issuing at least two of the plurality of subqueries to the corresponding data sources at different times, which are calculated based on the expected response time for each of the data sources.

6. A computing system having a memory having computer readable instructions and one or more processors for executing the computer readable instructions, the computer readable instructions controlling the one or more processors to perform operations comprising:
   processing a query from a client device to divide the query into a plurality of subqueries;
   identifying a data source that corresponds to each of the plurality of subqueries;
   identifying an expected response time for each of the data sources;
   based on a determination that at least one of the expected response times is greater than a default timeout threshold, classifying the query as a delayed split query and updating a timeout value of the query to be a delayed timeout threshold, which is greater than the default timeout threshold; and performing a delayed split execution of the query, wherein performing the delayed split execution of the query includes determining an expected size of a result of the query, wherein based on a determination that the expected size of the result of the query is not greater than a threshold size, performing a delayed split execution of the query comprises:

issuing all of the plurality of subqueries to the corresponding data sources at a same time;

storing results received from each of the data sources in a cache;

based on a determination that the results from all of the data sources have been received, combining the results received from each of the data sources and returning the combined results to the client device.

7. The computing system of claim 6, wherein performing the delayed split execution of the query includes issuing at least two of the plurality of subqueries to the corresponding data sources at different times, which are calculated based on the expected response time for each of the data sources.

8. The computing system of claim 7, wherein each of the plurality of subqueries is issued to corresponding data sources such that an expected query response time for all of the plurality of subqueries are within a threshold time range.

9. The computing system of claim 6, wherein performing a delayed split execution of the query comprises:

issuing all of the plurality of subqueries to the corresponding data sources at a same time;

storing results received from each of the data sources in a cache;

based on a determination that the results from all of the data sources have been received, combining the results received from each of the data sources and returning the combined results to the client device.

10. The computing system of claim 6, wherein based on a determination that the expected size of the result of the query is greater than a threshold size, performing the delayed split execution of the query includes issuing at least two of the plurality of subqueries to the corresponding data sources at different times, which are calculated based on the expected response time for each of the data sources.

11. A computer program product comprising a computer readable storage medium having program instructions embodied therewith, the program instructions executable by a processor to cause the processor to perform operations comprising:

processing a query from a client device to divide the query into a plurality of subqueries;

identifying a data source that corresponds to each of the plurality of subqueries;

identifying an expected response time for each of the data sources;

based on a determination that at least one of the expected response times is greater than a default timeout threshold, classifying the query as a delayed split query and updating a timeout value of the query to be a delayed timeout threshold, which is greater than the default timeout threshold; and performing a delayed split execution of the query, wherein performing the delayed split execution of the query includes determining an expected size of a result of the query, wherein based on a determination that the expected size of the result of the query is not greater than a threshold size, performing a delayed split execution of the query comprises:

issuing all of the plurality of subqueries to the corresponding data sources at a same time;

storing results received from each of the data sources in a cache;

based on a determination that the results from all of the data sources have been received, combining the results received from each of the data sources and returning the combined results to the client device.

12. The computer program product of claim 11, wherein performing the delayed split execution of the query includes issuing at least two of the plurality of subqueries to the corresponding data sources at different times, which are calculated based on the expected response time for each of the data sources.

13. The computer program product of claim 12, wherein each of the plurality of subqueries is issued to corresponding data sources such that an expected query response time for all of the plurality of subqueries are within a threshold time range.

14. The computer program product of claim 11, wherein performing a delayed split execution of the query comprises:

issuing all of the plurality of subqueries to the corresponding data sources at a same time;

storing results received from each of the data sources in a cache;

based on a determination that the results from all of the data sources have been received, combining the results received from each of the data sources and returning the combined results to the client device.

15. The computer program product of claim 11, wherein based on a determination that the expected size of the result of the query is greater than a threshold size, performing the delayed split execution of the query includes issuing at least two of the plurality of subqueries to the corresponding data sources at different times, which are calculated based on the expected response time for each of the data sources.

* * * * *